No. 700,762. Patented May 27, 1902.
T. J. GOODWIN.
VENTILATOR FLUE.
(Application filed July 26, 1901.)
(No Model.)
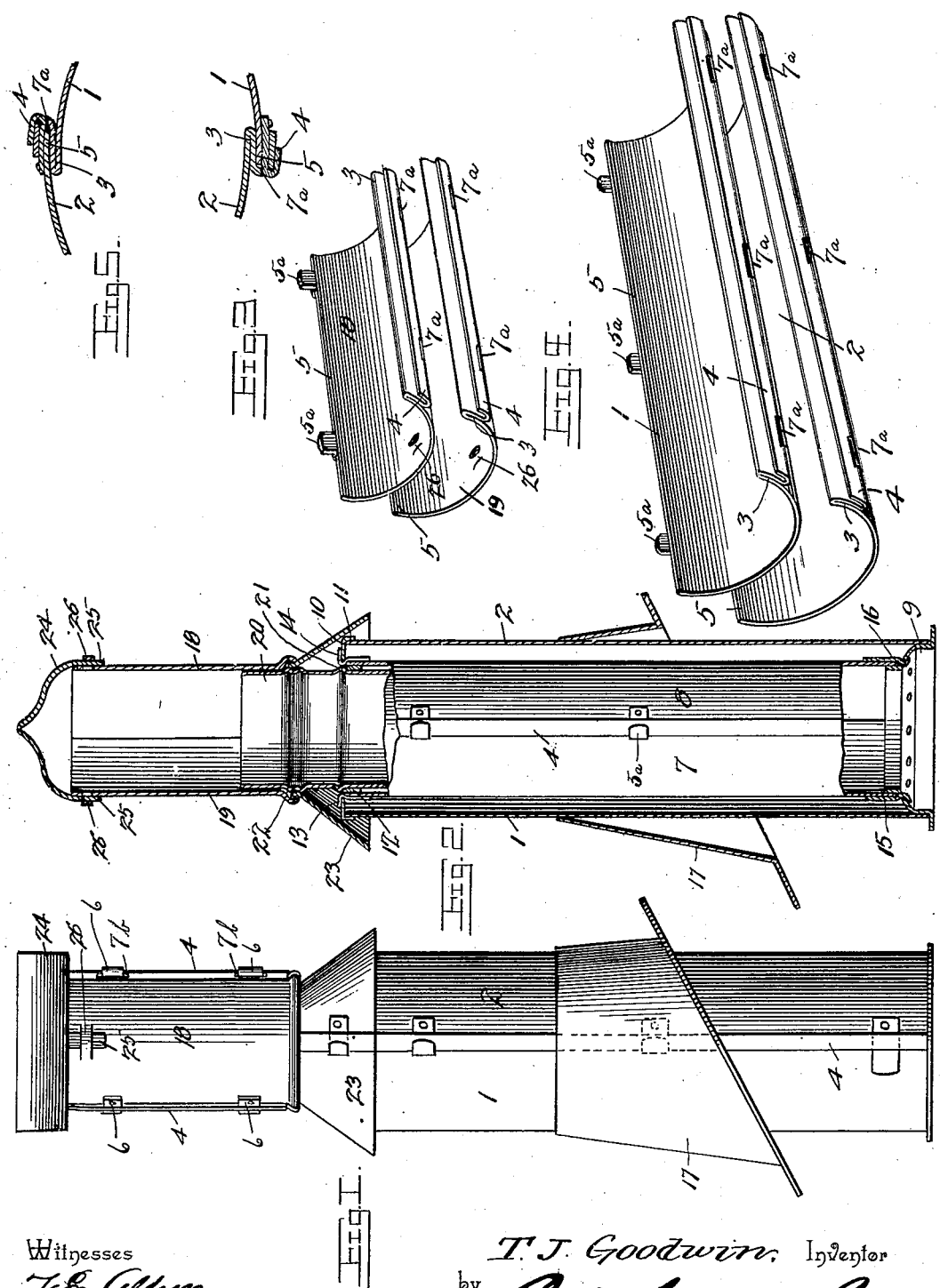

UNITED STATES PATENT OFFICE.

THOMAS J. GOODWIN, OF LAMPASAS, TEXAS.

VENTILATOR-FLUE.

SPECIFICATION forming part of Letters Patent No. 700,762, dated May 27, 1902.

Application filed July 26, 1901. Serial No. 69,800. (No model.)

*To all whom it may concern:*

Be it known that I, THOMAS J. GOODWIN, a citizen of the United States, residing at Lampasas, in the county of Lampasas and State of Texas, have invented a new and useful Flue, of which the following is a specification.

This invention relates to flues for general use, and has for its object the production of a flue constructed of detachable parts that, dismembered, will "nest" or pack one within the other, so as to occupy less space while being shipped.

The invention is capable of being applied to any form of sheet-metal flue, and for the purpose of illustration I have shown it in the drawings applied to an approved form of flue.

Figure 1 represents a side elevation of the device complete. Fig. 2 is a sectional elevation. Figs. 3 and 4 are perspective views of sections of parts of the casings, illustrating the manner of "nesting" or packing them. Fig. 5 shows enlarged sectional details of the detachable fastenings or couplings.

The flue employed for illustration shows an outer casing formed in two main sections 1 and 2, one of each section formed with one edge folded over, as at 3, and thence folded back again upon the first fold, as at 4, the latter fold forming a socket adapted to receive the opposite unfolded edge 5 of the other section, as shown in Fig. 5, which represents the two folds and embraced unfolded edges of a pair of sections. By this means the two sections when combined form a completed cylinder with overlapping joints. To "lock" the sections thus united, small clips $5^a$ are attached to the unfolded edges 5 of the sections and adapted to pass through apertures $7^a$, formed through the bottom of the folds 4, and be bent back over the folds, as shown in Figs. 1, 2, and 5. By this means the two sections are securely "locked" together while at the same time are easily detachable by simply bending the outer ends of the clips backward until they are in alinement with the sections 1 and 2 again, as shown at the lower part of Fig. 1, when the two sections may be easily disconnected.

The flue shown is of the double style, consisting of an outer shell formed of the sections 1 and 2 and an inner shell formed of similar but smaller sections 7 and 8, having the folded-over edges and the locking-clips of the same construction as in the sections 1 and 2. As all the folded-over edges and the clip-fastenings are the same in all the various parts, they are denoted by like letters of reference throughout the drawings. The two sections are connected at their lower edges to annular perforated collar or socket 9, having an air-chamber between the two sections, through which the air will freely pass. The upper edges of the two main sections are coupled by an annular perforated ring or collar 10, the outer edge of the collar being turned downward outside the outer section 1 and 2, as at 11, and the inner edge turned downward inside the inner section 7 and 8, as shown at 12 in Fig. 2. Attached to the inner section 7 and 8 are small clips 13 and 14, adapted to project through apertures in the collar 10 and be bent outward over the collar, and thus form a means for detachably locking the collar to the sections, and similar clips 15 and 16 will be attached to the lower edge of the inner section 7 and 8 and adapted to pass through apertures in the collar 9 and be bent over the collar to form a means for detachably connecting the collar to the sections. Surrounding the outer section 1 and 2 is a roof-shield 17 of the usual form, which will be slidable upon the sections and inclined to conform to the "pitch" of the roof through which the flue projects. Connected removably to the upper end of the main flue-sections is an extension-flue, and above this extension-flue is a cap or rain-shield for the extension, and between the extension-flue and the main flue is a rain-shield collar.

The extension-flue consists of two semicylindrical sections 18 and 19, having the turned-over edges 3 and 4 and clips 6, which are passed through corresponding slots or apertures $7^b$, the same as the sections 1 2 and 7 8, as shown in Fig. 3, which represents these two sections 18 and 19 detached and placed in position to be "nested" or packed for shipment.

20 is a short coupling-section secured to the sections 18 and 19 and adapted to be inserted into the upper end of the section 7 and 8, with a rib 21 rolled therein to limit its downward movement and also provided with one or more ribs rolled into it, as at 22, to support a conical rain-shield 23, as shown in Fig. 2. This rain-shield 23 will be divided on one side and with one of the edges at the division folded over, as upon the sections 1 2 and 7 8, and with a clip of the same construction as in those latter sections, as shown in Fig. 1, wherein these parts are designated by the corresponding letters of reference. The upper edge of the rain-shield will be turned outward and adapted to engage the coupling above the rib 22.

The lower part of the extension-section 18 and 19 is arranged to set over the upper part of the coupling-section and with its lower edge turned inward and engaging the outwardly-turned upper edge of the rain-shield, as shown in Fig. 2, so that the contact between the extension-section, the coupling-section, and the rain-shield will be assured and a rain-proof joint provided between the parts.

24 is a rain-cap having clips 25 projecting therefrom and adapted to pass beneath strips 26 on the extension-section 18 and 19 and adapted to be turned upward over the strips to lock the cap member to the extension-section.

The sections may be formed of any size or length required, as the invention is equally applicable to flues of all dimensions. By this arrangement all the different parts of the flue may be disconnected and nested or packed into small compass for convenience in shipping, while at the same time when set up and locked by bending the clips backward the flue will be as complete and perfect as any flue formed with the ordinary construction.

What I claim as new is—

1. In a flue, an outer shell formed of separable sections capable of being united to form a flue and an inner shell composed of separable sections also capable of being united to form a flue of smaller diameter than said outer shell, the parts of each shell being adapted to be nested or packed one within the other.

2. In a flue, an outer shell of separable sections capable of being united to form a flue, an inner shell of separable sections capable of being united and to form a flue of smaller diameter than said outer shell, and annular collars uniting said separable shells detachably, whereby said sections and collars may be separated and nested or packed, substantially as shown and described.

3. In a flue, an outer shell of separable sections capable of being united to form a flue, an inner shell of separable sections capable of being united to form a flue of smaller diameter than said outer shell, a conical separable rain-shield engaging said coupling-flue and extending over said main flue, and an extension-flue formed of separable sections and engaging said rain-shield and said coupling-section, substantially as shown and described.

4. In a flue, an outer shell of separable sections capable of being united to form a flue, an inner shell of separable sections capable of being united to form a flue of smaller diameter than said outer shell, a conical separable rain-shield extending over said main flue and with its smaller end turned outward and engaging said coupling-section, and an extension-flue formed of separable sections and with the lower edge turned and engaging the outwardly-turned edge of said rain-shield, substantially as shown and described.

5. In a flue, a flue formed of separable sections capable of being united to form a flue and separated and nested and packed one within the other, and a rain-shield cap composed of separably-united sections and located above said flue, substantially as shown and described.

6. In a flue, a flue formed of separable sections capable of being united to form a flue and separated and nested and packed one within the other, and a rain-shield cap having clips adapted to be separably engaged by said flue-sections, substantially as shown and described.

In testimony that I claim the foregoing as my own I have hereto affixed my signature in the presence of two witnesses.

THOMAS J. GOODWIN.

Witnesses:
M. K. McCAUSLAND,
W. J. CAIN.